(12) United States Patent
Reinert et al.

(10) Patent No.: US 11,237,540 B2
(45) Date of Patent: Feb. 1, 2022

(54) METHOD AND TOOLING MACHINE FOR THE MACHINING OF WORKPIECES WITH AN UNKNOWN WORKPIECE GEOMETRY

(71) Applicant: Haas Schleifmaschinen GmbH, Trossingen (DE)

(72) Inventors: Marcel Reinert, Spaichingen (DE); Martin Krausse, Rottweil (DE)

(73) Assignee: Haas Schleifmaschinen GmbH, Trossingen (DE)

( * ) Notice: Subject to any disclaimer, the term of this patent is extended or adjusted under 35 U.S.C. 154(b) by 109 days.

(21) Appl. No.: 16/570,318

(22) Filed: Sep. 13, 2019

(65) Prior Publication Data
US 2020/0089194 A1  Mar. 19, 2020

(30) Foreign Application Priority Data

Sep. 17, 2018  (EP) .................................... 18194823

(51) Int. Cl.
*G05B 19/4093* (2006.01)
*G05B 19/4069* (2006.01)
(Continued)

(52) U.S. Cl.
CPC ..... *G05B 19/40931* (2013.01); *G01B 21/045* (2013.01); *G05B 19/401* (2013.01);
(Continued)

(58) Field of Classification Search
None
See application file for complete search history.

(56) References Cited

U.S. PATENT DOCUMENTS

2002/0104227 A1   8/2002 Trull et al.
2009/0025463 A1   1/2009 McFarland et al.
(Continued)

OTHER PUBLICATIONS

European Patent Office, "European Search Report" issued in European patent application No. 18194823.3, dated Mar. 15, 2019, document of 9 pages.
(Continued)

*Primary Examiner* — Ryan A Jarrett
(74) *Attorney, Agent, or Firm* — Akerman LLP; Peter A. Chiabotti (57) ABSTRACT

A method for the machining of workpieces that have an unknown workpiece geometry with a tooling machine, said method having the steps of clamping of the workpiece in a clamping device on the tooling machine, execution of a manually guided 3D line scan with a measurement sensor within the tooling machine to determine the workpiece geometry in a first dataset, processing of the first dataset to compensate for errors in the manually guided 3D line scan in order to obtain a second dataset, use of the second dataset for 3D CAD surface generation by the tooling machine for the generation of a rough component geometry, use of the rough component geometry for the generation of scan paths for an automatic 3D line scan, execution of an automatic 3D line scan of the workpiece with the measurement sensor within the tooling machine in order to obtain a third dataset, use of the third dataset for 3D CAD surface generation for the generation of a precise component geometry, and automated machining of the workpiece by the tooling machine based on the precise component geometry, and a tooling machine for the execution of the method are provided.

10 Claims, 8 Drawing Sheets

(51) Int. Cl.
*G01B 21/04* (2006.01)
*G05B 19/401* (2006.01)
*G05B 19/4097* (2006.01)

(52) U.S. Cl.
CPC ..... *G05B 19/4069* (2013.01); *G05B 19/4097* (2013.01); *G05B 19/40938* (2013.01); *G05B 2219/35152* (2013.01)

(56) References Cited

U.S. PATENT DOCUMENTS

| | | |
|---|---|---|
| 2014/0012409 A1 | 1/2014 | McMurtry et al. |
| 2015/0066196 A1 | 3/2015 | Wooldridge et al. |
| 2015/0101204 A1* | 4/2015 | Quid ................... G01B 21/045 33/503 |
| 2015/0121710 A1 | 5/2015 | McMurtry et al. |
| 2016/0103443 A1* | 4/2016 | Bryll ................. G02B 21/0064 700/114 |
| 2016/0327933 A1 | 11/2016 | Kawai et al. |

OTHER PUBLICATIONS

European Patent Office, "European Search Report" issued in European patent application No. 18/194,823 3, dated Nov. 2, 2021, document of 8 pages.

Von Manfred Week und Thomas A.W. Tilli, "Learning programming of machine tools for automatic cast fettling", Technische Rundschau, 81, May 19, 1989, No. 20, 70-77, document of 30 pages, XP000045995.

* cited by examiner

Fig. 8

METHOD AND TOOLING MACHINE FOR THE MACHINING OF WORKPIECES WITH AN UNKNOWN WORKPIECE GEOMETRY

CROSS-REFERENCE TO RELATED APPLICATIONS

This application claims priority to European Patent Application No. 18 194823.3, filed Sep. 17, 2018, which is incorporated by reference in its entirety.

SUMMARY

In modern, computer-controlled tooling machines, the machining of a workpiece is generally done on the basis of a dataset which describes the workpiece geometry. In many cases, such a dataset is generated during the design of the workpiece to be produced, in particular when this is done on a computer, and can be obtained from 3D models, 2D contours or drawings, for example. By contrast, in cases in which such data is not initially available, an appropriate dataset must first be obtained. Exemplary use cases are, for example, the post-processing of stamping tools for the automotive industry and the reprocessing of workpieces in the aerospace industry.

Currently, the normal procedure in such cases is to determine the workpiece geometry in an external 3D measuring machine in a first step and then to use the measurement data to generate a 3D drawing manually or on the basis of specific measurement points captured with a joystick. This data is then edited into a dataset in a CAD/CAM system, imported into the tooling machine, and can be used by its control system for automated machining after the workpiece has been remounted in the tooling machine.

However, this method is not only complex, because it requires multiple data processing steps on different systems, it is also suboptimal with regard to its precision, in particular because the workpiece must be remounted and its position is therefore changed.

The present disclosure provides a method for the machining of workpieces with an unknown workpiece geometry with a tooling machine and a tooling machine for the machining of workpieces with an unknown workpiece geometry which reduces the complexity of machining and allows for more precise machining of the workpiece.

The present disclosure further provides a method for the machining of workpieces with an unknown workpiece geometry with a tooling machine and through a tooling machine for the machining of workpieces with an unknown workpiece geometry having the features and structures described herein. Advantageous embodiments of the present application are further disclosed herein.

The method according to the present disclosure for the machining of workpieces with an unknown workpiece geometry with a tooling machine has the following steps which should, in particular, preferably be executed in this order, but do not necessarily have to be executed immediately one after the other:

Clamping of the workpiece in a clamping device on the tooling machine,

Execution of a manually guided 3D line scan with a measurement sensor within the tooling machine to determine the workpiece geometry in a first dataset, Processing of the first dataset to compensate for errors in the manually guided 3D line scan in order to obtain a second dataset, Use of the second dataset for 3D CAD surface generation by the tooling machine for the generation of a rough component geometry, Use of the rough component geometry for the generation of scan paths for an automatic 3D line scan, Execution of an automatic 3D line scan of the workpiece with the measurement sensor within the tooling machine in order to obtain a third dataset, Use of the third dataset for 3D CAD surface generation by the tooling machine for the generation of a precise component geometry, and Automated machining of the workpiece by the tooling machine based on the precise component geometry.

Using the method according to the present disclosure, the entire machining process can be executed on a single machine, which provides the advantage that, on the one hand, remounting of the workpiece in particular is avoided and, on the other hand, the necessity of transferring data between different systems and/or software environments and the resultant necessity of establishing data compatibility through suitable conversion is consequently avoided.

In particular, a reduction in the qualification requirements for personnel who are used for the machining of workpieces with an unknown workpiece geometry can be achieved in this way. Essentially, the only thing the operator still has to do is execute the manually guided 3D line scan and set the surface type to be used in order to generate the initial model.

All subsequent steps can be executed automatically. This also applies in particular for 3D CAD surface generation, which can be done automatically for a specified surface type. Appropriate modules are part of the applicant's Multigrind® Horizon machine software, for example.

All of this results in a noticeable reduction in the time and cost requirements and/or in an improvement in the results of workpiece machining.

In an advantageous further development of the method, a quality control is performed on the third dataset and/or the 3D CAD surface generated from the third dataset before the use of the third dataset for the generation of a precise component geometry and, in the event that the quality of the third dataset is insufficient, this is improved. This quality control can in particular be performed automatically after the quality criteria to be met have been defined. For example, differences between the measured values can be checked for whether they fall within the error tolerance to be expected, and whether measurement points from which the third dataset was defined are below the model surface and therefore in a physically implausible position can be determined.

Such an improvement can be done through processing of the third dataset, on the one hand, and/or through the execution of an iterative improvement of the third dataset by using the component geometry obtained through 3D CAD surface generation from the third dataset to perform a new automated 3D scan which is used to generate an improved third dataset, which can then be subjected to another quality control.

Preferably, during execution of the manually guided 3D line scan, the measurement sensor is moved along one or more lines on the clamped workpiece. Three such 3D line scans are sufficient to obtain an approximate component geometry based on the surface by means of 3D CAD surface generation, even for a double curved surface.

Most preferably, adaptive tracking by the tooling machine occurs during execution of the manually guided 3D scan through manual movement of the measurement sensor, i.e. the relative position of the workpiece to the measurement sensor is changed though a change in the position of the clamping device and/or a change in the position of the measurement sensor which is positioned on the tooling machine, which is possible in particular through a movement of the axes of the tooling machine. An advantageous option lies, for example, in positioning of the measurement sensor on a machine bridge, the movement of which on the y and z axes and the movement in the x direction is realized through a movement of the clamping device on the tooling machine.

This adaptive tracking by the tooling machine preferably occurs through monitoring of the deflection of the measurement sensor in real time during movement of the measurement sensor and use of this monitoring to regulate the traversing speed. Surprisingly, this leads to results of the manually guided 3D line scan which are qualitatively significantly better than when a position change of the measurement sensor is used in order to determine an appropriate target position for the tooling machine's adaptive tracking from it.

The measurement sensor senses the workpiece with a ball tip and provides information concerning the position of the center of the ball tip in space each time. Such measurement sensors are commercially available together with the associated evaluation software. This information still does not reflect the actual workpiece geometry in its own right because, among other things, the contact point of the ball on the surface moves. Such a movement is also advantageously taken into account in the reconstruction of the workpiece model from the results of the manual and/or machine line scans.

Through adaptive tracking of the workpiece by the tooling machine, which can likewise be tracked in time, you gain the option of correlating the current machine coordinates and the current measurement sensor coordinates with one another and thus determining the actual ball position within the scope of the machine coordinates and, as a result, generating a suitable model surface from the data.

In a preferred further development, smoothing, removing of incorrect measurement values, checking of the physical plausibility of the measurement data or a combination of these measures are performed for processing of a dataset, in particular for processing of the first dataset from the manually guided 3D scan to obtain the second dataset, but also for an iterative improvement of the third dataset to compensate for errors in a 3D scan, which measures can preferably also occur automatically once the appropriate criteria to be used have been defined.

A tooling machine according to the present disclosure for the machining of workpieces with an unknown workpiece geometry has a clamping device for a workpiece and at least one axis, controlled by a control system, for the machining of a workpiece clamped in the clamping device.

It is essential to the present disclosure that the tooling machine has a measurement sensor which is configured for the execution of a manual 3D scan of the workpiece clamped in the clamping device and for the execution of at least one automatic scan which is controlled by the control system, wherein the control system is programmed and/or configured for execution of a procedure in which at least the following steps are performed:

clamping of the workpiece in a clamping device on the tooling machine, execution of a manually guided 3D line scan with a measurement sensor within the tooling machine to determine the workpiece geometry in a first dataset, processing of the first dataset to compensate for errors in the manually guided 3D line scan in order to obtain a second dataset, use of the second dataset for 3D CAD surface generation by the tooling machine for the generation of a rough component geometry, use of the rough component geometry for the execution of an automatic 3D line scan of the workpiece with the measurement sensor within the tooling machine in order to obtain a third dataset, use of the third dataset for 3D CAD surface generation by the tooling machine for the generation of a precise component geometry, and automated machining of the workpiece by the tooling machine based on the precise component geometry.

Most preferably, the controller is programmed and configured here such that adaptive tracking by the tooling machine occurs during execution of a manual 3D scan with the measurement sensor, i.e. the relative position of the workpiece to the measurement sensor is changed though a change in the position of the clamping device and/or a change in the position of the measurement sensor which is positioned on the tooling machine, which is possible in particular through a movement of the axes of the tooling machine. An advantageous option lies, for example, in positioning of the measurement sensor on a machine bridge, the movement of which is realized on the y and z axes and the movement in the x direction is realized through a movement of the clamping device.

This is preferably done through the presence of means for monitoring the position of the measurement sensor in space in real time and through the controller being programmed and configured such that the speed of the adaptive tracking is controlled based on the data obtained from this real-time monitoring.

BRIEF DESCRIPTION OF THE DRAWINGS

In the following, the present application will be described in greater detail with reference to figures which show exemplary embodiments, in which.

DETAILED DESCRIPTION

Figure 1:
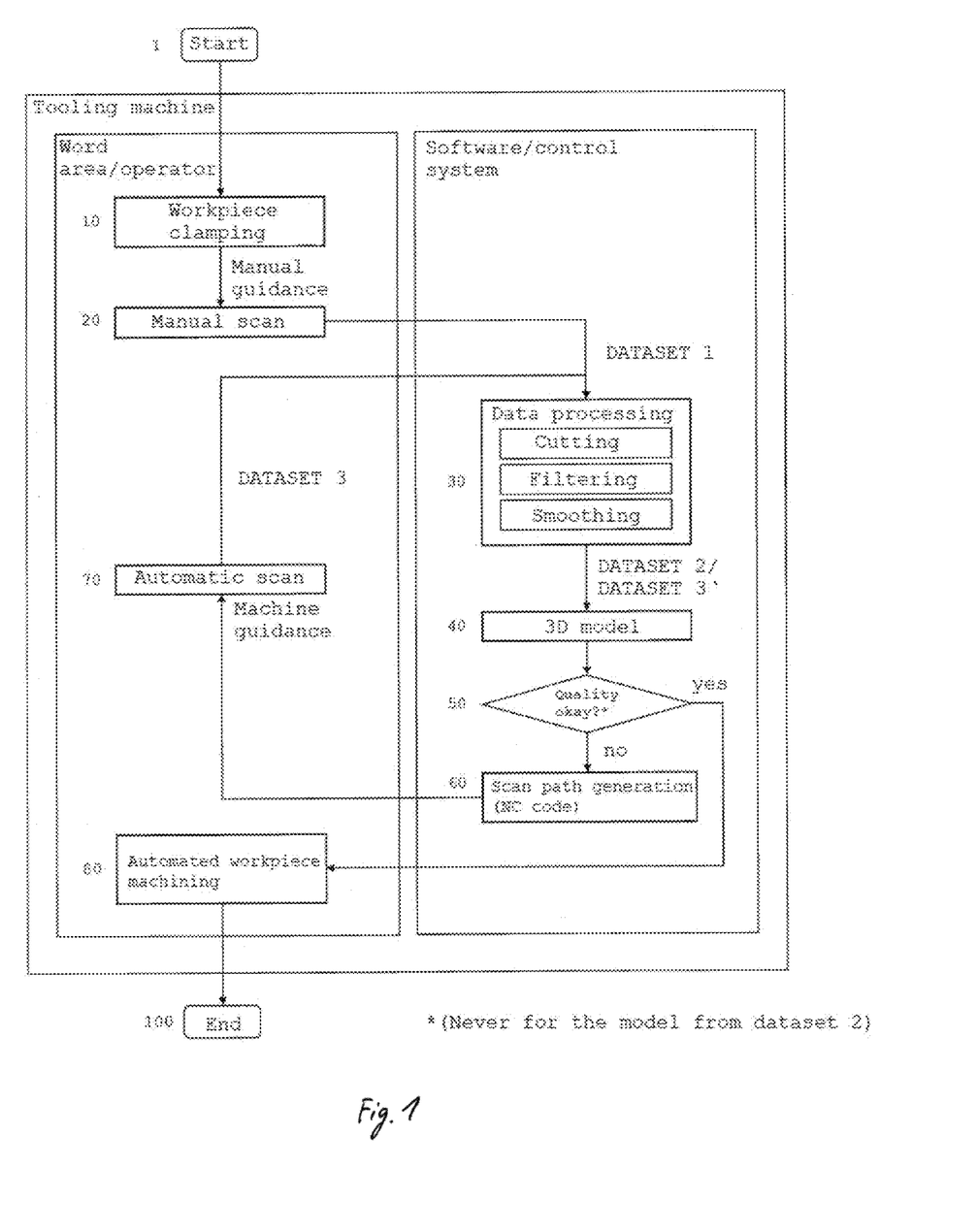
FIG. 1: shows a flow diagram of a possible exemplary process flow.

FIG. 1 shows a flowchart for an embodiment of the method according to the present disclosure. Here, the spatial arrangement of the process steps in FIG. 1 reflects whether they are steps which occur in the machining area of the machine or whether they are steps which are executed by the machine control system. The former are shown on the left-hand side, the latter on the right-hand side.

At the start 1 of the method, a workpiece with an unknown geometry, i.e. a workpiece for which no 3D model is available as a basis for computer-controlled machining of the workpiece by the tooling machine, is clamped in step 10 by a machine operator.

A manually guided 3D line scan is then performed by the machine operator in step 20 with manual guidance. In concrete terms, this means that the machine operator takes hold of the measurement sensor, which is positioned on a machine bridge, for example, with which the movement of the y and z axes of the tooling machine is realized while a movement in the x direction is realized through a movement of the workpiece holder, and displaces it towards the first starting point.

Through this displacement movement, a set of voltages is generated in the measurement sensor which each represent the displacement in a specific direction in space and thus the change in the position of the ball of the measurement sensor in space by a certain distance.

It should be noted at this point that the data points are often incorrect in the event of a very large displacement of the measurement sensor, for example if a proportional range of the voltage generated is dropped out, meaning that in this case the corresponding data point may be incorrect. Conversely, relevant errors also occur with a very small displacement of the measurement sensor, caused by voltage generation and evaluation for low voltages for example, meaning that these measurement points are also plagued by increased uncertainty. Measurement sensors for which the control software also provides information, alongside the respective data points, as to whether the data point was obtained in an area with a displacement which was too large or too small are already available on the market.

In order to achieve a reliable description of the actual workpiece geometry from the 3D line scan, it is therefore necessary to ensure that the measurement sensor is operated within a certain displacement range during the entire 3D line scan to the greatest extent possible; this is ultimately also a reason why it is mandatory, according to the present disclosure, for at least one additional automated 3D line scan to be performed.

Naturally, the displacement movements of the measurement sensor which can be realized are limited, which is why they are kept within feasible limits, preferably through the tooling machine being adaptively tracked during the manually guided 3D scan. Adaptive tracking means that the measurement sensor, which is positioned on the machine bridge for example, does not have to be displaced, in particular pulled down, the full distance to a point below its current position in order to reach this point, but rather that the pulling down of the measurement sensor, i.e. displacement in the z direction, at the beginning of this movement results in the machine bridge beginning to lower or a displacement under an angle of 45° in the x-y plane causes a corresponding change in the position of the machine bridge and/or the workpiece holder in this plane.

Since, as mentioned above, the voltage signal resulting from the pulling down of the measurement sensor can be associated with a defined change of position in space by the measurement sensor and/or by a piece of software which is used to operate it, in principle a command to carry out this change of position can be transmitted to the machine control system for the tooling machine in order to realize this tracking.

Surprisingly, however, it appears that the quality of the 3D line scan can be significantly improved if, instead, the machine control system does not move to a specific position, but rather the appropriate machine axes receive a continuous movement command; although the feed factor, i.e. the movement speed, correlates to the displacement, in the simplest case it is directly provided by the current displacement. Accordingly, for this preferred type of adaptive tooling machine tracking, e.g. with a simple movement in the x-y plane under an angle of 45°, there would be a movement command on the x and y axes with the same feed factor, depending on the displacement of the measurement sensor in the plane, and a movement command on the z axis with a feed factor of 0. The movement speed of adaptive tracking is thus controlled here by monitoring of the displacement of the measurement sensor.

Figure 2:
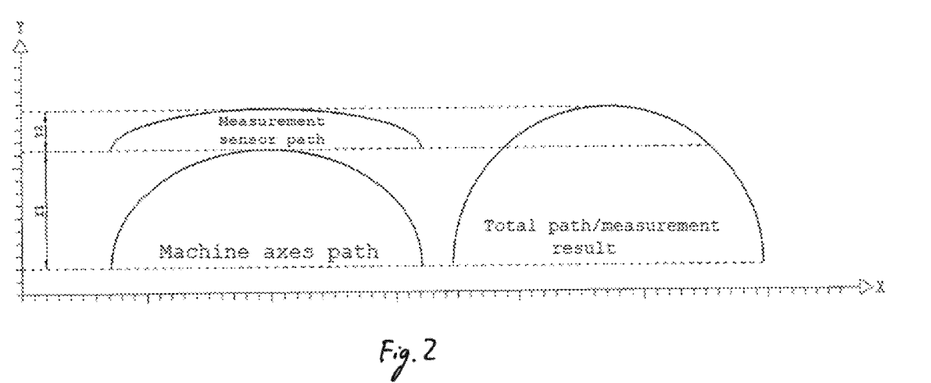
FIG. 2: shows a schematic illustration of the description of the surface geometry through a combination of machine and measurement sensor coordinates.

In this manner, a 3D line scan dataset is thus successively generated through manual guidance of the measurement sensor over the workpiece, with which dataset the surface geometry at a specified point is described by the current machine coordinates and the current displacement of the measurement sensor, as is schematically illustrated in FIG. 2.

Figure 3:
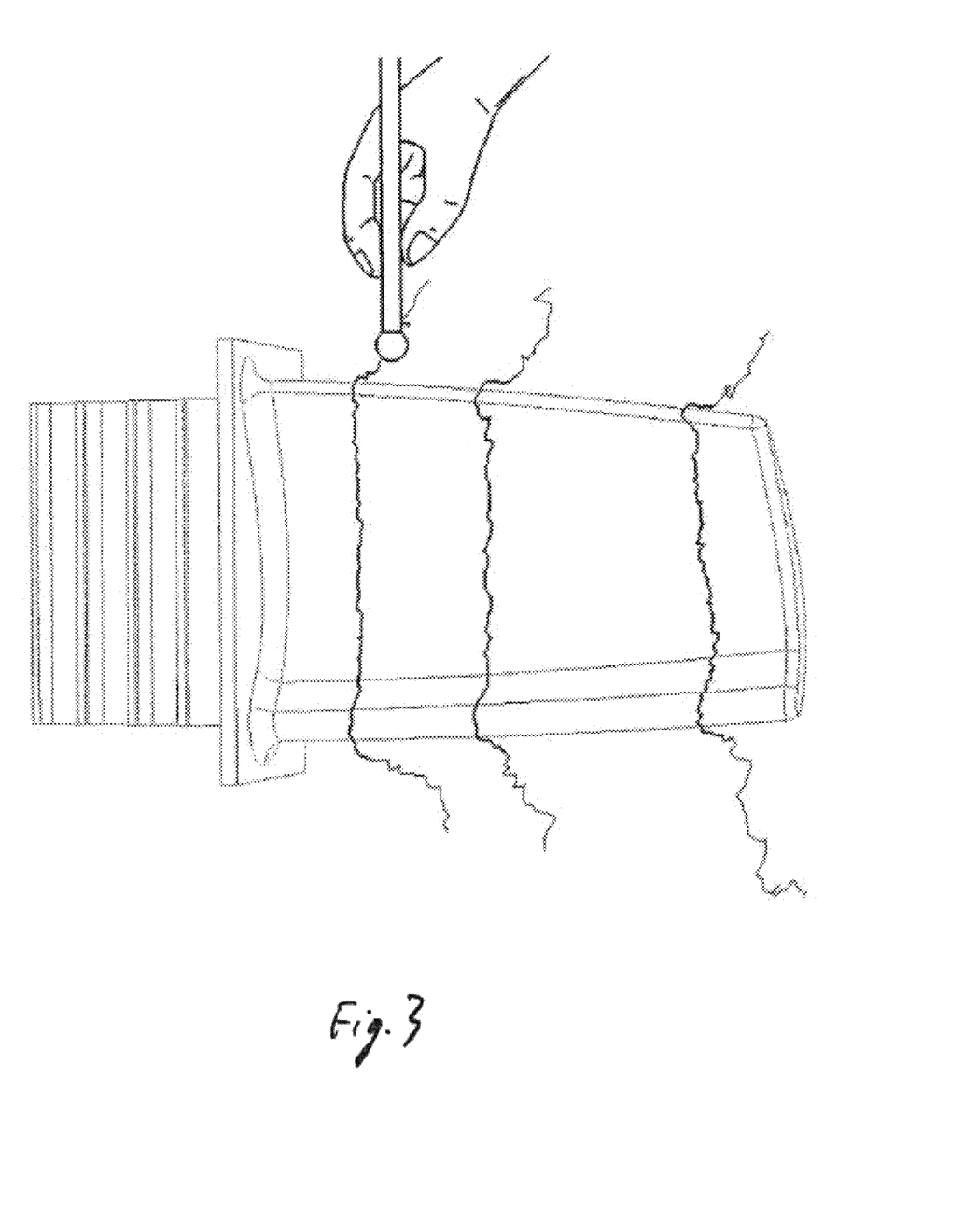
FIG. 3: shows an example of the result of a manually guided 3D line scan.

FIG. 3 shows the result of such a manually guided 3D line scan according to step 20 of the method for a workpiece with a complex, double-curved surface geometry.

Figure 7:
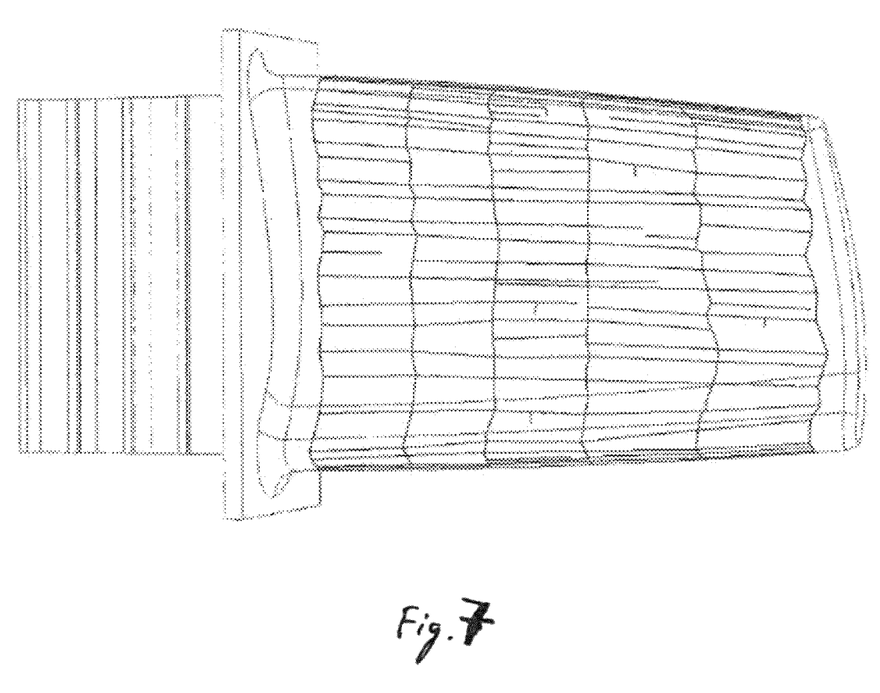
Figure 8:
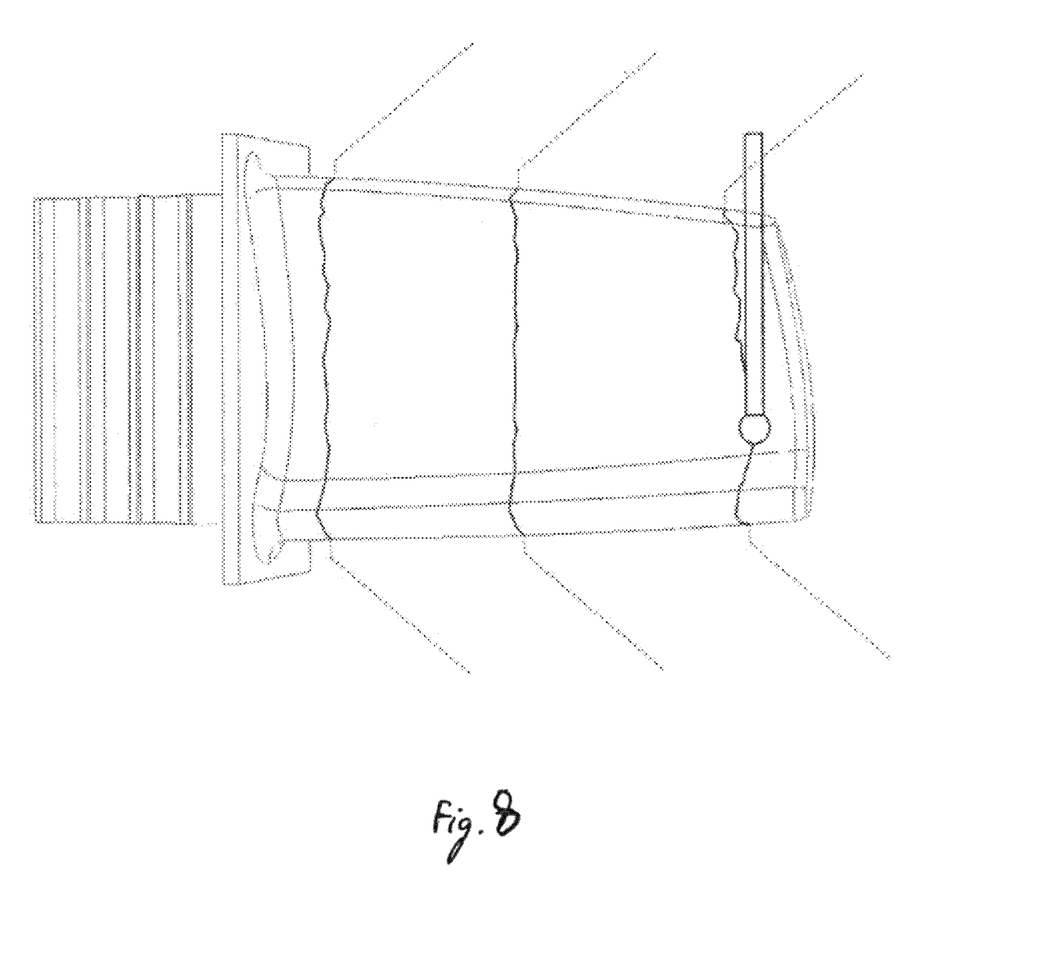

At first glance, this result is discouraging because a surface constructed from this data using the common, commercially available CAD routines, realized as part of the applicant's Multigrind® Horizon software, for example—contrary to the method according to the present disclosure—as shown in FIG. 7 has significant surface errors and manifestly cannot form the basis for the machining of the workpiece. It is not even suitable as a basis for further improvement by means of an automatic scan, as demonstrated by the example shown in FIG. 8.

The first dataset generated by the manual scan in step 20 is therefore processed in software, for example with a program which is run on the machine control system, using predefined criteria in step 30 according to the present disclosure in order to generate a second dataset.

It is advisable, for example, to eliminate the measurement points which can be associated with placement of the measurement sensor on the workpiece. The manually guided 3D line scan data also generally reflect shaking of the operator's hand, which is why smoothing is expedient. Furthermore, in many cases, filtering of the data is advisable, whereby in particular data points with particularly low or particularly high displacement of the measurement sensor can be filtered out entirely or simply taken into account with a lower weighting owing to the high uncertainties associated with these displacements as discussed above.

Figure 4:
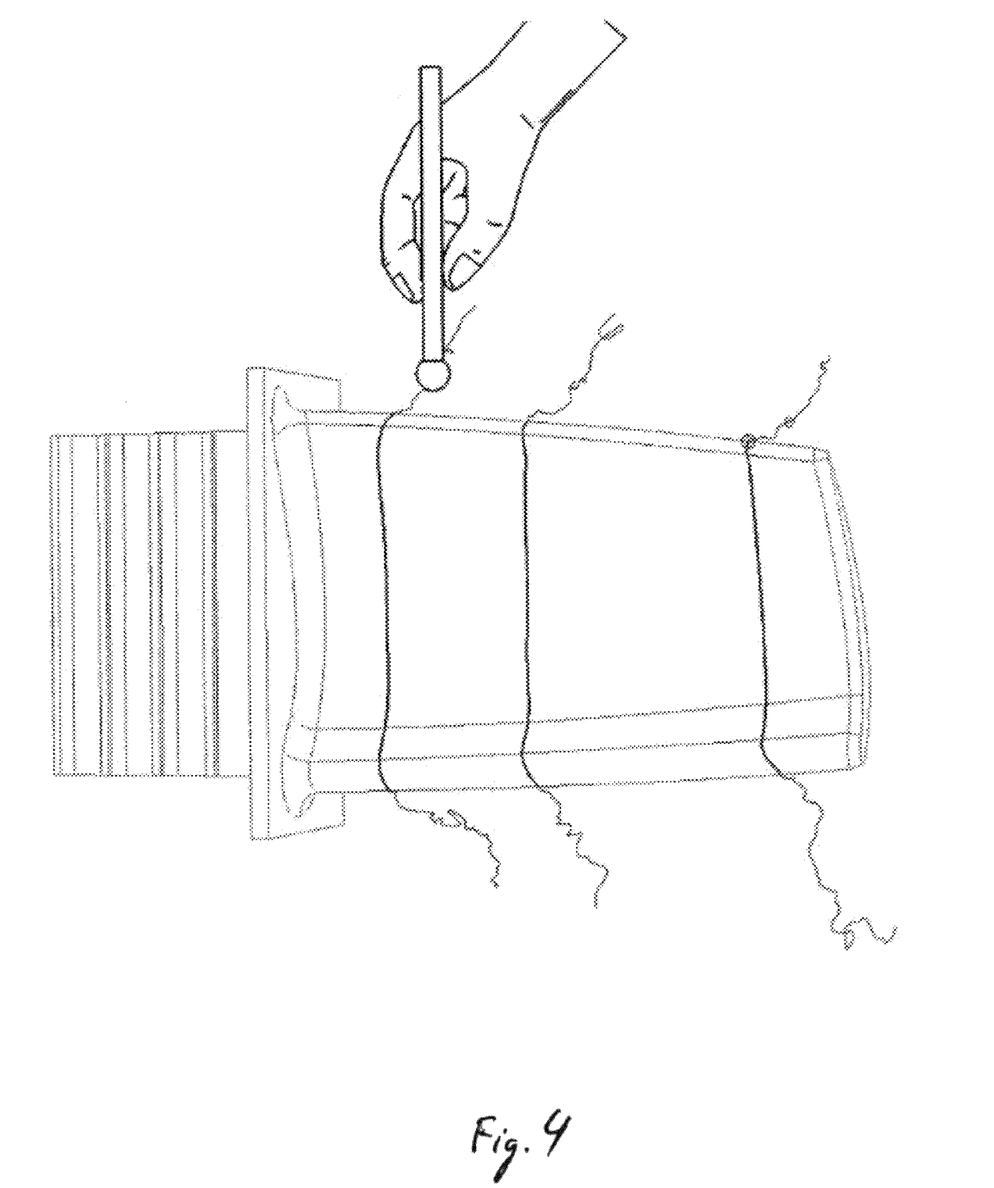
FIG. 4: shows the manually guided 3D line scan according to FIG. 3 after being processed.

Appropriate processing criteria can be defined and the software which then automatically carries out processing can be specified. In FIG. 4, the 3D scan lines processed through data processing according to step 30 are shown by way of example.

Figure 5:
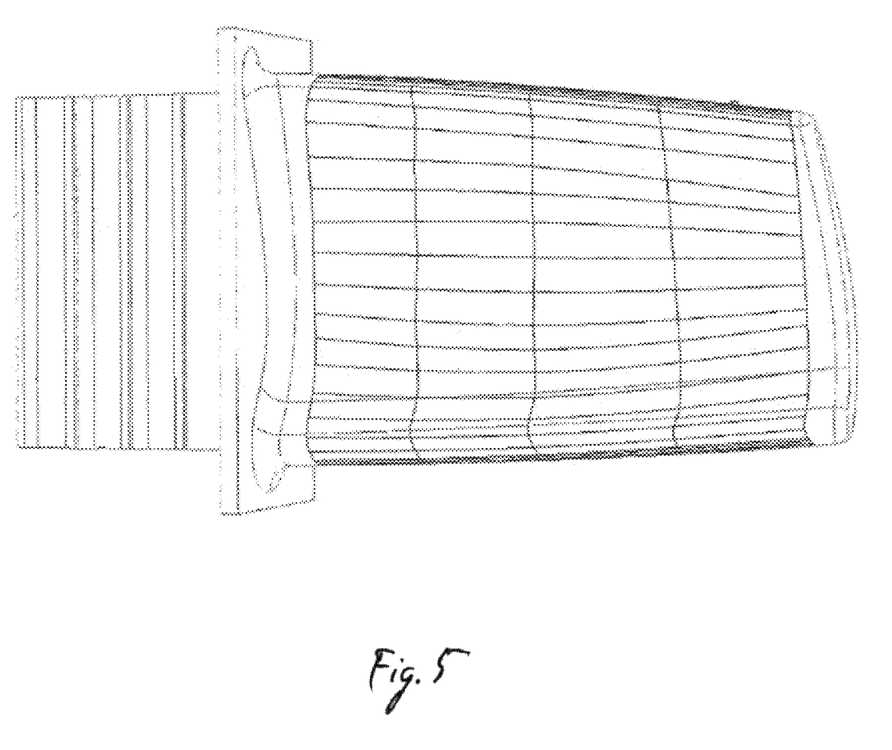
FIG. 5: shows a rough surface model obtained from the processed 3D line scan according to FIG. 4, FIG. 6: shows the result of the scan path for the automatic 3D line scan obtained using the rough surface model from FIG. 5, FIG. 7: shows a rough surface model which, in contrast to the present application, was obtained through the use of unprocessed data from the manually guided 3D scan according to FIG. 3, and FIG. 8: shows the result of a scan path for the automatic 3D line scan generated using the rough surface model from FIG. 7.

In step 40, a 3D model of the surface, which is shown in FIG. 5, is then generated from these processed 3D scan lines—for example using the common, commercially available CAD routines which are realized, for example, as part of the applicant's Multigrind® Horizon software.

This model no longer shows any obvious surface errors; however, it shows that it is generally not a sufficiently good basis for the automated machining of the workpiece. This is primarily attributable to the fact that, with the filtering of the manually guided 3D line scan, data points are not taken into account especially at points of the workpiece where there are significant changes in the actual surface contour of the workpiece and, accordingly, the surface is not correctly represented here.

It is therefore necessary to define a quality criterion which evaluates the quality of the 3D model particularly in light of the interventions implemented by the data processing, in particular filtering but also the effects of smoothing, as is done in step 50.

If the quality appears to be insufficient according to this evaluation, then another, higher quality 3D line scan dataset must be provided.

It should be noted that, owing to the significant interventions required during data processing, this is always the case for a 3D model based on processed manually guided 3D line scan data, meaning that step 50 can in fact also be skipped for a 3D model which is based on a dataset 2 generated through the processing of the data obtained from a manual scan and it is possible to continue directly with step 60. It is therefore actually only required for checking the quality of 3D models which are based on a dataset 3' generated through processing of the dataset 3 which was obtained from a machine scan.

This demonstrates that an intervention is implemented with the data processing the data in step 30 which actually appears, with open eyes, to be potentially counterproductive because it is still only possible to assume in exceptional cases, after application of data processing to data obtained with a manual scan, that the component geometry can be reproduced with sufficient precision and the corresponding 3D model obtained achieves sufficiently good quality for machining.

Surprisingly, however, it also shows that this geometry is nevertheless a sufficiently good basis for the generation of appropriate scan lines for an automated 3D line scan, with which the true surface shape can be approximated.

Figure 6:
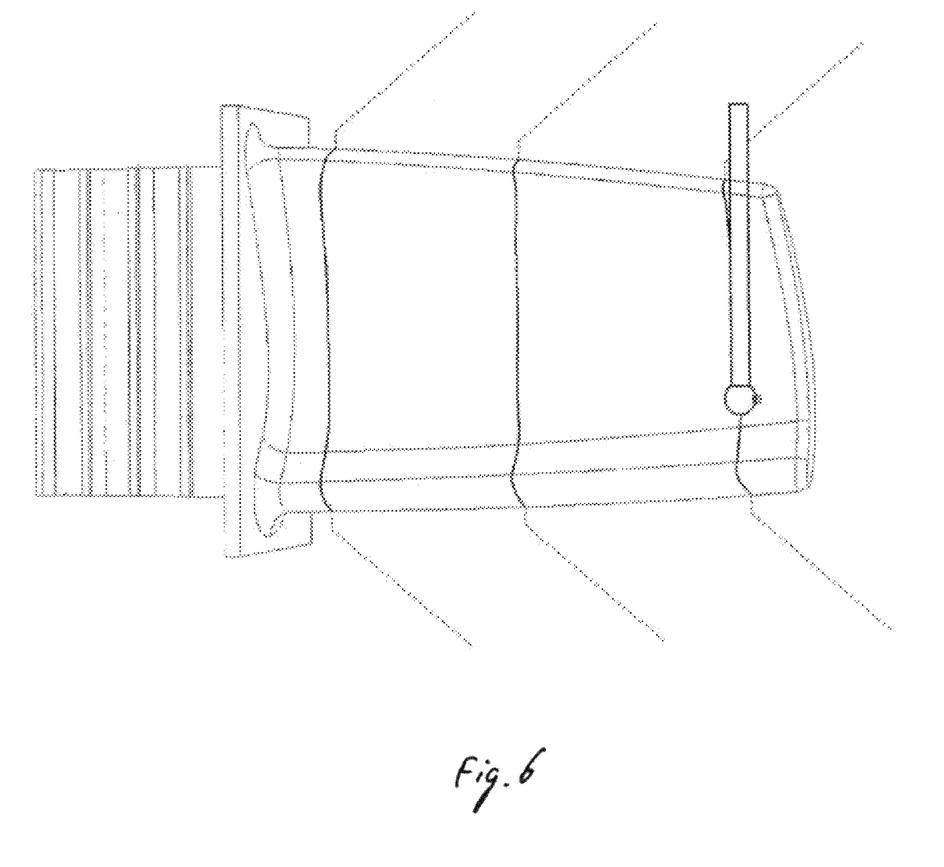

In concrete terms, the provision of this further, higher quality 3D line scan dataset is done through definition of scan paths in step 60 based on the 3D model of the surface which is now available by means of NC code which is generated in the applicant's Multigrind® Horizon software for example for a 3D line scan which is subsequently automatically executed by the tooling machine in step 70, which results in a third 3D line scan dataset. These scan paths are shown by way of example in FIG. 6.

This dataset too is preferably processed through repeated application of step 30 in order to generate a processed dataset 3', from which a 3D model of the workpiece is generated in step 40, for which a quality control is then carried out in step 50.

Since the result of the automatic 3D line scan does not have the shaking movement of the manual scan, less smoothing is generally required, resulting in lesser averaging effects in the reproduction of the surface structures. The number of data points plagued with high uncertainty to be filtered out owing to very large or very small displacement of the measurement sensor is generally lower here since these are reduced, on the one hand, by the much more even machine movement and, on the other hand, the interventions in the dataset can be taken into account in the generation of the scan paths in step 60.

Thus, for example, the density of the scanned points can be adjusted for significant changes in the surface contour which were already apparent in the initial model and/or at points at which a large number of points were significantly manipulated or removed during data processing.

Accordingly, it can be seen that the probability that the new model passes the quality test in step 50 is already significant after the first automatic 3D line scan, including for the processed data since the processing in this case routinely no longer intervenes as heavily in the data. If the quality achieved should nevertheless still be insufficient, a further sequence of steps 60, 70, 30, 40, 50 is performed until the quality test in step 50 is passed.

Once this is finally the case, the automated machining of the workpiece by the tooling machine can begin in step 80, the completion of which constitutes the end 100 of the method.

LIST OF REFERENCE NUMERALS

1 Start
10 Clamping of the workpiece
20 Execution of a manually guided 3D line scan
30 Processing of the dataset
40 Generation of a 3D CAD surface
50 Quality control
60 Generation of scan paths for the automatic 3D line scan
70 Execution of an automatic 3D line scan
80 Automated machining of the workpiece
100 End

The invention claimed is:

1. A method for the machining a workpiece with a tooling machine, comprising:
   clamping the workpiece having an unknown geometry in a clamping device on the tooling machine;
   obtaining a manually-guided 3D line scan of the workpiece with a handheld and hand guided measurement sensor by guiding the handheld and hand guided measurement sensor over the clamped workpiece to determine a workpiece geometry in a first dataset;
   processing the first dataset to compensate for errors in the manually-guided 3D line scan in order to obtain a second dataset;
   using the second dataset for 3D CAD surface generation for generation of a rough component geometry;
   using the rough component geometry for generation of scan paths for an automatic 3D line scan;
   executing an automatic 3D line scan of the workpiece with the measurement sensor within the tooling machine in order to obtain a third dataset;
   using the third dataset for 3D CAD surface generation for generation of a precise component geometry, and
   automated machining of the workpiece by the tooling machine based on the precise component geometry.

2. The method according to claim 1, wherein a quality control is performed on the third dataset and/or the 3D CAD surface generated from the third dataset before using the third dataset for generation of a precise component geometry, and improving the third dataset if the quality of the third dataset is insufficient.

3. The method according to claim 2, wherein improving the third data set comprises processing of the third dataset and/or through the executing an iterative improvement of the third dataset by using the component geometry obtained through 3D CAD surface generation from the third dataset to perform a new automated 3D scan which is used to generate an improved third dataset.

4. The method according to claim 1, wherein the measurement sensor is moved along one or more lines of the clamped workpiece during execution of the manually-guided 3D scan and measurement data is recorded at the same time.

5. The method according to claim 1, wherein adaptive tracking by the tooling machine occurs during execution of the manually-guided 3D scan through manual movement of the measurement sensor.

6. The method according to claim 5, wherein displacement of the measurement sensor is monitored in real time during adaptive tracking of the workpiece by the tooling machine and is used by the tooling machine to control a movement speed of the workpiece.

7. The method according to claim 1, wherein smoothing, removing incorrect measurement values, checking for physical plausibility of the measurement data, or a combination thereof, is implemented for the processing of the first dataset from the manually-guided 3D scan to obtain the second dataset, in order to compensate for errors in a 3D scan.

8. A tooling machine for machining a workpiece comprising:
- a clamping device for a workpiece and with at least one axis;
- a control system that controls the clamping device;
- a handheld and hand guided measurement sensor configured for obtaining a manually-guided 3D scan of the workpiece clamped in the clamping device and for execution of an automatic scan, wherein the measurement sensor is controlled by the control system, which is configured such that a method with the following steps is executed with it:
- clamping the workpiece having an unknown geometry in the clamping device on the tooling machine;
- obtaining a manually-guided 3D line scan of the workpiece with a handheld and hand guided measurement sensor by guiding the handheld and hand guided measurement sensor over the clamped workpiece to determine a workpiece geometry in a first dataset;
- processing the first dataset to compensate for errors in the manually guided 3D line scan in order to obtain a second dataset;
- using the second dataset for 3D CAD surface generation by the tooling machine for the generation of a rough component geometry;
- using the rough component geometry for generation of scan paths for an automatic 3D line scan;
- executing an automatic 3D line scan of the workpiece with the measurement sensor within the tooling machine in order to obtain a third dataset;
- using the third dataset for 3D CAD surface generation by the tooling machine for generation of a precise component geometry; and
- automated machining of the workpiece by the tooling machine based on the precise component geometry.

9. The tooling machine according to claim 8, wherein the controller is programmed and configured such that adaptive tracking by the tooling machine occurs during the execution of a manually-guided 3D scan with the measurement sensor.

10. The tooling machine according to claim 9, further comprising monitoring the position of the measurement sensor in space in real time, wherein the controller is programmed and configured such that a speed of adaptive tracking is controlled based on data obtained from the monitoring.

* * * * *